United States Patent Office 3,840,644
Patented Oct. 8, 1974

3,840,644
COMPOSITIONS CONTAINING DITHIONITES
Roland Albert Leigh, 9 Beckwith Road,
Harrogate, Yorkshire, England
No Drawing. Filed Jan. 10, 1972, Ser. No. 216,799
Claims priority, application Great Britain, Jan. 14, 1971,
1,930/71; July 1, 1971, 30,937/71; July 14, 1971
3,293/71
Int. Cl. C01b 17/66
U.S. Cl. 423—265     28 Claims

ABSTRACT OF THE DISCLOSURE

Metallic dithionite compositions stabilized by incorporation of a non-surfactant, non-polymeric compound containing at least 5 carbon atoms and comprising at least one group of the structure

where the unsatisfied valencies are filled by oxygen or carbon atoms.

---

This invention relates to compositions comprising a metallic dithionite, particularly sodium dithionite.

Aqueous solutions of dithionite are used extensively in the textile and pulp and paper industries as bleaching agents, as reducing agents for vat dyes and as means of destroying dyes containing azo links. The dithionite is normally stored as a solid until required. Commercially available powdered anhydrous sodium dithionite is stable for long periods in dry air but undergoes decomposition in the presence of water or water vapour. The action of water is initially to form the dihydrate of the dithionite with the liberation of heat. The dihydrate is particularly readily oxidised by atmospheric oxygen, again exothermically. If the heat liberated in these two reactions is not removed rapidly enough a third exothermic reaction may occur, namely, the spontaneous decomposition of the salt with the disengagement of sulphur dioxide and the formation of thiosulphate, bisulphite and sulphur. The heat liberated during these reactions may be so great that the temperature of the decomposing compositions rises above the ignition point of sulphur, so that the composition finally begins to burn. Since dithionites are often used in environments of high humidity this tendency to ignite is a serious problem which has in fact given rise to a number of fires in dye-houses and pulpmills.

It is known to reduce the ignitibility of dithionites by admixture of additives, a variety of which have been proposed. These previously suggested additives which have generally been water soluble materials vary in their modes of action and degrees of effectiveness. Some merely function as inert diluents to reduce the temperature rise when decomposition occurs. Other materials function in ways which are not entirely understood to inhibit either the initial or the later stages of decomposition. However the amount of stabilizer it is practicable to add is clearly limited, particularly since in many cases the stabilizer itself has a detrimental effect on the process in which the dithionite is to be used. For example, it has been proposed in W. German OLS 1,938,315 to stabilize dithionites by incorporation with a cationic, non-ionic or amphoteric surfactant but surfactants are an embarrassment in many of the applications in which dithionites are used.

It is also known from B.P. 1,061,299 to stabilize dithionites with one of a variety of certain specified synthetic polymers having particular K values but such materials are again not satisfactory in all respects.

There is, therefore, a continuing search for fresh stabilizers which are effective in lower concentrations than previous materials and/or are not detrimental in the intended application.

The present invention provides a substantially anhydrous composition comprising a major proportion of a metallic dithionite and a non-surfactant nonpolymeric compound containing at least 5 carbon atoms which comprises at least one group of the structure:

wherein the unsatisfied valencies are filled by oxygen, hydrogen or carbon atoms. Such compositions show a marked increase in stability to decomposition compared with unstabilized material and may be used in applications for which surfactant properties would be disadvantageous, by the bleaching of paper pulp.

The stabilizers for use in the compositions of the invention include a number of preferred categories. A first category consists of compounds which may be considered as derivatives of acids RCO$_2$H, where H is a substituted or unsubstituted alkyl or alkenyl group. These stabilizers have the general formula I:

I 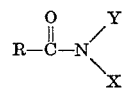

where R is a substituted or unsubstituted alkyl or alkenyl group having at least 7 carbon atoms; X and Y are the same or different groups being hydrogen; a group of the formula —(CH$_2$CHR'NH—)$_n$H, where R' is hydrogen or methyl and $n$ is an integer from 1 to 6; a group of the formula —CH$_2$(CHR')$_m$NHCOR where $m$ is 0 or 1 and R and R' are as hereinbefore defined, R being the same as or different from the other R group or a group of the formula CH$_2$CH$_2$OH or CH$_2$CH(OH)CH$_3$. Alternatively they may be compounds which are cyclic derivatives of a compound of the formula

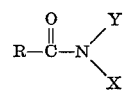

as aforesaid, formed therefrom by cyclodehydration, i.e. intramolecular cyclisation with removal of one molecule of water by condensation, which derivatives comprise a five membered heterocyclic ring containing two atoms other than carbon atoms. Stabilizers of the first category in general display superior effectiveness to that of most currently used materials thus permitting less stabiliser to be used than would be necessary with a previously known stabiliser.

The group R in aforesaid stabilizers of the first category will normally contain from 7 to 22, more preferably 8 to 18 carbon atoms and will preferably be derived from a naturally occurring fatty acid or mixtures of fatty acids such as capric, lauric, myristic, palmitic, stearic, oleic, linoleic or linolenic acid or mixtures thereof such as fatty acids obtained from palm oil, palm kernel oil, coconut oil or hydrogenated tallow. R may bear substituents such as alkyl, cycloalkyl, aryl or hydroxyl, may comprise one or more unsaturated alkenic or alkynic linkages and may comprise either straight or branched carbon chains. R may be derived from synthetic or mineral sources, e.g. naphthenic acids.

The stabilizers of the first category fall into a number of classes. Where X and Y are both hydrogen they are simple acid amides, RCONH$_2$. In such cases it has been found that the most effective stabilisation is achieved when the group R is unsaturated so that the amide has an iodine value of at least 45. The presence of an hydroxyl substituent in R also appears to enhance stabilisation.

Simple amides are readily obtained by ammonolysis of the corresponding acids or their esters by known procedures.

Stabilizers of the formula I where X is a group of the formula —$CH_2(CHR')_mNHCOR$ and Y is H are methylene ethylene, or propylene bis-amides, prepared for example, by reaction of one or more amides, $RCONH_2$, with formaldehyde, or by reaction of one or more acids, $RCO_2H$, with ethylenediamine or propylenediamine. Methylene and ethylene bis stearamides and bis oleamides are examples of such materials.

Stabilizers of the formula I where X is a group (—$CH_2CHR'NH$—)$_n$ H and Y is H are obtained by reaction of acid $RCO_2H$ with ethylene or propylene polyamines such as ethylene or propylene diamine, diethylene or dipropylene triamine or the like, $n$ being from 1 to 6. Preferably $n$ is 1 or 2. Either or both groups X and Y in formula I may also be —$CH_2CH_2OH$ or a

—$CH_2CH(OH)CH_3$ groups, the compound of formula I being then a mono or di-ethanolamide or a mono or a diisopropanolamide derivative formed from reaction of one molecule of the corresponding alkanolamine with acid $RCO_2H$.

Stabilizers of the first category may also be five-membered heterocyclic ring structures formed by an internal condensation reaction of a compound of formula I as aforesaid. For example a monoethanolamide of formula

may be cyclodehydrated by known methods, e.g. straightforward heating or by heating with an acidic dehydrating agent to yield an oxazoline of the formula

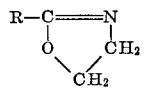

useful according to the invention. Also a compound of formula I where X is ($CH_2CHR'NH$—)$_n$H and Y is H may be treated similarly to yield an imidazoline useful according to the invention, e.g. when $n$ is 1 and R' is H an imidazoline of the structure

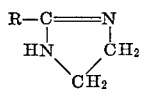

A second category of stabilizers for use in the compositions of the invention has the formula II II 

wherein X and Y are as hereinbefore defined and R" is a substituted or unsubstituted aryl group; or are cyclic derivatives of a compound of the formula II formed therefrom by cyclodehydration, i.e. intramolecular cyclisation with removal of one molecule of water by condensation, which derivatives comprise a five-membered heterocyclic ring containing two atoms other than carbon atoms.

The group R" may be aryl groups such as phenyl or naphthyl which may bear inert substituents, e.g. alkyl, cycloalkkyl or halo-groups.

Particularly preferred compositions comprising a stabilizer of the second category are those comprising as a stabilizer methylene bis (benzamide).

A third preferred category of stabilizers useful according to the invention are the following derivatives of methylol arayl- and alkanolamides R'''$CONHCH_2OH$, where R''' is a substituted or unsubstituted alkyl, aryl or alkenyl group having at least 6 carbon atoms:

1. Pyridinium salts of the general formula

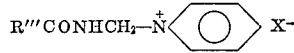

where X$^-$ is an anion. Such materials are readily prepared by known means. The compound where R''' is $C_{17}H_{35}$ (stearamidomethyl pyridinium chloride) is well known as an agent in the water repellent treatment of fabrics.

2. Thiocyanate and phosphate esters of methylol amides R'''$CONHCH_2OH$.

3. Ethers, preferably water soluble or self-emulsifiable of methylolamides R'''$CONHCH_2OH$ with hydroxycarboxylic acids and methyloloxycarboxylic acids, especially hydroxyacetic acid and methyloloxyacetic acid.

The groups R''' in the aforesaid stabilising compounds are substituted or unsubstituted aryl, alkyl or alkenyl groups containing at least 6 carbon atoms. The groups R''' which are alkyl or alkenyl will normally contain 7 to 22, more preferably 8 to 18, carbon atoms, and will preferably be derived from a naturally occurring fatty acid or mixtures of fatty acids such as capric, lauric, myristic, palmitic, stearic, oleic, linoleic or linolenic acid or mixtures thereof such as fatty acids obtained from palm oil, palm kernel oil, coconut oil or hydrogenated tallow. R''' may bear substituents such as alkyl, cycloalkyl, aryl or hydroxyl, may comprise one or more unsaturated alkenic or alkynic linkages and may comprise either straight or branched carbon chains. R''' may be derived from synthetic or mineral sources, e.g. naphthenic acids. R''' may also bear substituents rendering the stabilising compound water soluble. Such substituents may be cationic, anionic or non-ionic solubilizing substituents such as isothionic acid derived substituents; polyglycol ether substituents, e.g. substituents derived from the reaction products of oleic acid methyolamide and ethylene oxide or pyridinium chloride substituents.

Stabilizers in the third category are generally water soluble materials, many of which are readily soluble in water at room temperature and others of which are readily soluble at moderately elevated temperatures e.g. 50–80° C. In some cases the stabilizers are not water soluble but are self-emulsifiable, i.e. capable of forming a uniform dispersion in water.

Stabilizers in the first and second categories are generally substantially insoluble materials. This may be desirable to avoid interference with any processing operation in which dithionites are used, by the bleaching of paper pulp.

Such materials include ethylene and methylene bis-stearamides, tallow acid monoethanolamide and lauric acid diethanolamide. With the exception of oleamide simple amides are less preferred.

The quantity of stabilizer employed in the novel compositions will depend upon its effectiveness and upon the intended lifetime and storage conditions of the composition. The effectiveness of the novel stabilizers, although in general greater than that of previously known materials, may vary within wide limits so that in some cases a stabilised composition might contain, say, as little as 0.02% by weight of the composition as stabilizer. In other cases it might be found desirable to employ up to 5% or in extreme cases, 10% on the same basis; concentrations of from 0.2, more often 0.5%, to 3%, especially 1% to 2% are suitable in the main. The effectiveness of any given stabilizer may readily be tested by a standard method involving the addition of water to a stabilised dithionite under controlled conditions followed by the addition of a further quantity of the stabilised dithionite and observation of the ensuing temperature rise. Such a method is described in the examples given hereinafter.

The novel stabilizers are solid in most cases and may therefore be easily mixed with a dithionite by known methods, mixing being as intimate as possible. In a few cases the novel stabilizers may be soft or sticky low melting solids in which case they may be mixed with the dithionite dissolved in an organic solvent, e.g., isopropanol, which may subsequently be evaporated or distilled off. Alternatively the stabilizer may be mixed into the dithionite as a melt. On the other hand the additive may be incorporated into the dithionite during the last stages of dithionite manufacture instead of into the already manufactured dithionite. For example, an alcohol-wet filter cake of a dithionite may be mixed with an alcoholic solution of a novel stabilizer before drying in a rotary vacuum dryer. Alternatively additive may be dissolved or dispersed in a solution or slurry of a dithionite prior to evaporation to dryness in suitable equipment. If desired a known free flowing agent such as a sodium phosphate or a sodium salt of a condensed phosphoric acid, soda ash, sodium bicarbonate, sodium benzoate, EDTA or, preferably, urea may be added. However, the presence of a free flowing agent will not normally be necessary.

The invention is particularly applicable in the stabilisation of sodium dithionite, but other metal dithionites, such as the potassium or calcium dithionites may be stabilised similarly. The invention is also applicable in the stabilisation of dithionite products of low strength, for example sodium dithionite products containing from 50% to 90% of $Na_2S_2O_4$.

Stabilizers for use according to the invention are non-polymeric compounds, which term has its normal significance as connoting a compound containing not more than a few, say 5–10 repeating units. It will generally be found that the present stabilizers have molecular weights below 500, or at most, 600. They are also non-surfactant materials, by which is meant that they do not significantly reduce the surface tension of water.

The novel compositions may be used in general in any application in which dithionites are at present used, e.g. in the stripping of dyes from textiles, the reduction clearing of dyed fibres and in the bleaching of textile materials and paper pulp. The novel compositions are of particular utility in the bleaching of paper pulp.

The invention is illustrated by the following examples: In the examples the effectiveness of various stabilizers was tested by a method comprising deposition on the surface of a stabilized dithionite sample of a quantity of water insufficient to dissolve the sample, further deposition of more stabilized dithionite onto the surface and measurement of the ensuing temperature rise. Such a method is novel and constitutes a further aspect of the invention. The use of one or more thermocouples attached to a recording potentiometer to measure the temperature rise is preferred. Most preferably a plurality, e.g. 4 to 6, thermocouples are employed, located at different points in the dithionite sample. The particular method adopted for the examples was as follows:

100 g. of a blend of sodium dithionite and potential stabilizing material in known proportions is placed in a 250 ml. Dewar flask and 7 ml. of distilled water added in one minute by means of a metering pump, the mixture being stirred continuously during this addition. Six thermocouples are then introduced into the Dewar to enable temperature changes in various parts of the mixture to be observed, all six thermocouples being connected to a six-point recording potentiometer. After 3 minutes a further 100 g. of the dithionite mixture is added to the flask and recording of the temperature of the mixture continued until it returns to ambient temperature.

A number of the novel stabilizers and materials falling outside the scope of the invention were examined by this method and the results are given in Tables I, II and III. In all cases the temperature of the mixture rose over a period of about one to three hours to a value of from around 130 to 140°. After this point a dramatic variation in behaviour was noted between stabilized compositions of the invention (Tables I and II) and compositions admixed with other materials (Table III). In the former cases, the temperature of the compositions gradually returned to ambient, but the other compositions in all cases showed a further rapid rise in temperature beyond 130–140° C. up to 250–350° C. In some cases the sample ignited. This difference demonstrates the utility of the test method adopted since when the other compositions were tested by a method such as used hitherto, involving the straightforward addition of water to the sample and measurement of the ensuing temperature rise without addition of further dithionite, no temperature rise beyond 130° C. was observed. (See Table IV).

Details of the Examples using the test method described to examine stabilized compositions of the invention are tabulated in Table I.

TABLE I

| Ex. | Stabilizer | Concentration of stabilizer in composition (percent w./w.) | Observed temperature effect |
|---|---|---|---|
| 1 | 12-hydroxy-stearamide. | 2 | Composition heated up over 45 minutes to 131° C., remained at this temperature for ca. 40 mins. then gradually cooled to ambient temperature. No local ignition occurred. |
| 2 | Stearamide. | 10 | Temperature rose to 134° C. over 1 hr. 50 mins. and subsequently fell to ambient value. No local ignition occurred. |
| 3 | Palm kernel fatty acids mono-ethanolamide. | 2 | Temperature rose to 140° C. over 1 hr. 30 mins. then gradually fell to ambient value. No local ignition occurred. |
| 4 | Ethylene bis stearamide. | 2 | Temperature rose to 130° C. over 45 mins. then gradually fell to ambient value. No local ignition occurred. |
| 5 | do | 1 | Temperature rose to 150° C. over 50 mins. then gradually fell to ambient value. No local ignition occurred. |
| 6 | Methylene bis stearamide. | 2 | Temperature rose to 130° C. over 45 mins. then gradually fell to ambient value. No local ignition occurred. |
| 7 | do | 1 | Temperature rose to 146° C. over 55 mins. then fell to ambient value. No local ignition occurred. |
| 8 | Oleamide. | 2 | Temperature rose to 140° C. over 1 hr. 45 mins. then gradually fell to ambient value. No local ignition occurred. |
| 9 | Lanolin fatty acids amide. | 2 | Temperature rose to 132° C. over 50 mins. then gradually fell to ambient value. No local ignition occurred. |
| 10 | Lauric acid diethanol-amides. | 1 | Temperature rose to 133° C. over 1 hr. then fell to ambient value. No local ignition occurred. |
| 11 | Lauric acid di-ethanolamide with excess free ethanolamine (manufactured by Kritchevsky reaction). | 1 | Temperature rose to 145° C. over 1 hr. 10 mins. and then gradually fell to ambient value. No local ignition occurred. |
| 12 | Tallow fatty acids monoethanol-amide. | 1 | Temperature rose to 135° C. over 1 hr. then gradually fell to ambient value. No ignition occurred. |
| 13 | Amides of lauric and myristic fatty acids (ratio 70 parts C12 acid to 30 parts C14 acid). | 1 | Temperature rose to 145° C. over 1 hr. 20 mins. then fell to ambient value. No local ignition occurred. |
| 14 | As Example 13 | 1 | Temperature rose to 138° C. over 1 hr. 20 mins. then fell to ambient value. No local ignition occurred. |

TABLE I—Continued

| Ex. | Stabilizer | Concentration of stabilizer in composition (percent w./w.) | Observed temperature effect |
|---|---|---|---|
| 15 | Oxazoline as sold under the registered trade name "Crodazoline S (PP 618)." | 2 | Temperature rose to 149° C. over 1¼ hrs. then gradually fell to ambient value. No ignition. |
| 16 | Methylene bis (stearamide). | 2 | Temperature to 134° C. over 55 minutes then fell to ambient value. |
| 17 | Sodium oleamidomethane sulphonate. | 2 | Temperature rose to 131° C. over 70 mins. then gradually fell to ambient. No local ignition occurred. |
| 18[a] | do | 2 | Temperature rose to 144° C. over 2 hrs. 15 mins. then gradually fell to ambient. No local ignition occurred. |
| 19 | A stearamidomethylpyridinium chloride sold under the trade name "Velan PF" (approximately 60% active). | 2 | Temperature rose to 137° C. over 1 hr. 5 mins. then gradually fell to to ambient value. No local ignition occurred. |
| 20[a] | As Example 19 | 3 | Temperature rose to 129° C. over 33 mins. then gradually fell to ambient value. No local ignition occurred. |
| 21[a] | do | 1 | Temperature rose to 131° C. over about 30 mins. then gradually fell to ambient value. No local ignition occurred. |
| 22[a] | do | 2 | Temperature rose to 129° C. over 43 mins. then gradually fell to ambient value. No local ignition occurred. |

[a] These Examples employed low strength (60–70%) $Na_2S_2O_4$ and the test method was modified by use of 6 mls. water instead of the usual 7 mls.

In a further series of tests a variety of stabilizers of the invention were examined by the method used in the Examples of Table I. In all cases the temperature of the mixture of sodium dithionite and stabilizer rose to a maximum then gradually returned to ambient value. The stabilizers tested in the given concentrations are shown against the maximum test temperature attained in Table II.

TABLE II

| Ex. | Stabilizer | Concentration of stabilizer in mixture (percent w./w.) | Maximum temperature attained (° C.) |
|---|---|---|---|
| 23 | Methylene bis (stearamide) | 2 | 126 |
| 24 | Maleanilic acid | 1 | 127 |
| 25 | PhNHCOCH=CHCOOH | 1 | 125 |
| 26 | Sodium phthalanilate | 1 | 125 |
| 27 | o-$C_6H_4$(COONa)(CONHPh) | 1 | 125 |
| 28 | Disodium stearamidomethane phosphonate. | 1 | 126 |
| 29 | Acetanilide | 2 | 126 |
| 30 | $PhNHCOCH_3$ | 2 | 138 |
| 31 | Phthalimido-acetic acid | 1 | 126 |
| 32 | N-methylenecarboxyphthalimide | 1 | 124 |
| 33 | Stearamidomethane phosphonic acid. | 1 | 131 |
| 34 | $CH_3(CH_2)_{16}CONHCH_2PO(OH)_2$ | 1 | 130 |
| 35 | N-phenylurea | 2 | 132 |
| 36 | $PhCONHNH_2$ | 1 | 125 |
| 37 | 2-imidazolidone | 1 | 126 |
| 38 | $\begin{array}{c}CH_2-NH\\ \phantom{CH_2-}\diagdown\\ \phantom{CH_2-NH}C=O\\ \phantom{CH_2-}\diagup\\ CH_2-NH\end{array}$ | 1 | 127 |
| 39 | N-2-hydroxyethyl phthalimide | 1 | 124 |
| 40 | N-(β-hydroxyethyl)phthalimide | 1 | 125 |

Samples of sodium dithionite admixed with materials other than stabilizers of the invention were then examined for stability by the novel test method. Results are given in Table III.

TABLE III

| Ex. | Admixed material | Concentration of admixed material (percent w./w.) | Observed temperature effect |
|---|---|---|---|
| 41 | Polyvinyl-pyrrolidone, k-value=30. | 2 | Temperature rose to 142° C. over 55 mins. then very quickly to 362° C. |
| 42 | PVP-co-polymer as sold under name "Antarox V 904." | 2 | Temperature rose to 148° C. over 65 mins., then very rapidly to 334° C. |
| 43 | Alginic acid grade HS/LD (Alginic Industries Ltd.). | 5 | Temperature rose to 132° C. over 60 min., then, more rapidly to 426° C., with ignition. |
| 44 | Methyl cellulose powder as sold under trade name Celacol M10000 DS. | 5 | Temperature rose to 150° C. over 60 mins., then, more rapidly, to 458° C. with ignition. |
| 45 | High molecular weight ethylene oxide polymer as sold under trade name "Polyox Coagulant" by Union Carbide Ltd. | 5 | Temperature rose to 135° C. over 60 mins., then, more rapidly, to 433° C., with ignition. |
| 46 | Poly(methyl vinyl ether) maleic anhydride resin as sold under trade name "Gantrez AN 119." | 2 | Temperature rose to 133° C. over 70 mins., then, more rapidly, to 435° C. with ignition. |
| 47 | Water soluble polyacrylic acid k-value=116, as sold under trade name "Versicol EN 23" by Allied Colloids Ltd. | 5 | Temperature rose to 169° C. over 60 mins., then, very rapidly to 350° C. |
| 48 | Polyvinyl alcohol powder as sold under trade name "Collasyn TA" by Allied Colloids Ltd. | 5 | Temperature rose to 143° C. over 60 mins., then, to 391° C., with ignition. |

A number of the previously known stabilizers used in Examples 41–48 were then tested by a conventional method is follows:

A 100 g. sample of a commercial sodium dithionite admixed with stabilizing material in known proportion was placed in a beaker and 7 mls. water added rapidly with thorough mixing. 6 thermocouples, connected to a 6 point recording potentiometer were then rapidly inserted into the mixture and temperature alterations observed. Results were tabulated in Table IV.

TABLE IV

| Ex. | Stabilizer | Concentration of stabilizer in composition (percent) | Observed temperature effect |
|---|---|---|---|
| 49 | As in Example 42 | 2 | Temperature rose to 125° C. and then gradually fell. No ignition. |
| 50 | As in Example 45 | 2 | Temperature rose to 129° C. then fell. No ignition. |
| 51 | As in Example 46 | 2 | Temperature rose to 129° C. then fell. No ignition. |

As a further comparison the test method of Table I was carried out on a 100 g. sample of sodium dithioniite as used previously to which no stabilizer had been added. The temperature of the mixture rose to 131° C. over 50 minutes followed by a sudden and very rapid rise to 320° C.

We claim:

1. A substantially anhydrous composition comprising a major proportion of a metallic dithionite and an effective amount of a stabilizer therefore which is a non-surfactant compound containing at least 5 carbon atoms and at least one group of the structure:

wherein the unsatisfied valencies are filled by oxygen, hydrogen or carbon atoms, said compound being monomeric or containing not more than 10 repeating units and having a molecular weight of up to 600.

2. A composition as claimed in claim 28 wherein the stabilizer has the general formula I I 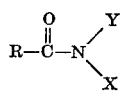

where R is a substituted or unsubstituted alkyl or alkenyl group having at least 7 carbon atoms; X and Y are the same or different groups being hydrogen; a group of the formula —$(CH_2CHR'NH-)_nH$, where R' is hydrogen or methyl and $n$ is an integer from 1 to 6; a group of the formula —$CH_2(CHR')_mNHCOR$ where $m$ is 0 or 1 and R and R' are as hereinbefore defined, R being the same as or different from the other R group or a group of the formula $CH_2CH_2OH$ or $CH_2CH(OH)CH_3$.

3. A composition as claimed in claim 2 wherein the group R contains from 7 to 22 carbon atoms.

4. A composition as claimed in claim 2 wherein the stabilizer is tallow acid monoethanolamide.

5. A composition as claimed in claim 2 wherein the stabilizer is lauric acid diethanolamide.

6. A composition as claimed in claim 2 wherein X in formula I is a group —$CH_2(CHR')NHCOR$ and Y is hydrogen.

7. A composition as claimed in claim 6 wherein the stabilizer is selected from the group consisting of methylene bis stearamide, ethylene bis stearamide, methlyene bis oleamide and ethylene bis oleamide.

8. A composition as claimed in claim 2 wherein X in formula I is a group (—$CH_2CHR'NH$—)$_nH$, wherein $n$ is from 1 to 6, and Y is hydrogen.

9. A composition as claimed in claim 8 wherein $n$ is 1 or 2.

10. A composition as claimed in claim 2 wherein at least one group X and Y in formula I is —$CH_2CH_2OH$ or —$CH_2CH(OH)CH_3$.

11. A composition as claimed in claim 28 wherein the stabilizer has the formula II II 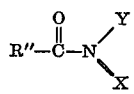

wherein X and Y are as hereinbefore defined and R″ is a substituted or unsubstituted aryl group.

12. A composition as claimed in claim 11 wherein the stabilizer is methylene bis(benzamide).

13. A composition as claimed in claim 28 wherein the stabilizer is a derivative of a compound of formula R‴CONHCH$_2$OH, wherein R‴ is a substituted or unsubstituted alkyl, aryl or alkenyl group having at least 6 carbon atoms, said compound being a pyridinium salt, a thiocyanate or phosphate ester or an hydroxycarboxylic acid ether of said compound of formula

R‴CHNHCO$_2$OH

14. A composition as claimed in claim 13 wherein the stabilizer is a water soluble or self-emulsifiable ether of a hydroxycarboxylic acid.

15. A composition as claimed in claim 13 wherein the stabilizer is an ether of hydroxyacetic or methyloloxyacetic acid.

16. A composition as claimed in claim 13 wherein the group R‴ in the stabilizer is an alkyl or alkenyl group containing from 7 to 22 carbon atoms.

17. A composition as claimed in claim 1 wherein the stabilizer is present in an amount of from 0.02 to 10% by weight on the composition.

18. A composition as claimed in claim 28 wherein the stabilizer is present in an amount of from 0.5 to 3% by weight on the composition.

19. A composition as claimed in claim 2 wherein the stabilizer is present in an amount of from 0.02 to 10% by weight on the composition.

20. A composition as claimed in claim 19 wherein the stabilizer is present in an amount of from 0.5 to 3% by weight on the composition.

21. A composition as claimed in claim 11 wherein the stabilizer is present in an amount of from 0.02 to 10% by weight on the composition.

22. A composition as claimed in claim 13 wherein the stabilizer is present in an amount of from 0.02 to 10% by weight on the composition.

23. A composition as claimed in claim 22 wherein the stabilizer is present in an amount of from 0.5 to 3% by weight on the composition.

24. A composition as claimed in claim 1 which further comprises a free flowing agent.

25. A composition as claimed in claim 1 wherein the dithionite is of sodium, potassium or calcium.

26. A process for preparing a composition as claimed in claim 1 which comprises admixture of the dithionite with a solution of the stabilizer in an organic solvent and subsequent evaporation of the solvent.

27. A process for preparing a composition as claimed in claim 28 which comprises mixing the dithionite with a melt of the stabilizer.

28. A composition as claimed in claim 1 wherein said stabilizer has a molecular weight below 500.

References Cited
FOREIGN PATENTS
1,061,299   3/1967   Great Britain _____ 423—515

EARL C. THOMAS, Primary Examiner

U.S. Cl. X.R.
423—515; 252—188